(12) United States Patent
Yeo et al.

(10) Patent No.: US 7,855,970 B2
(45) Date of Patent: Dec. 21, 2010

(54) METHOD FOR RETRANSMISSION IN MOBILE COMMUNICATION SYSTEM

(75) Inventors: Geon-Min Yeo, Daejon (KR); Kang-Hee Kim, Busan (KR); Byung-Han Ryu, Daejon (KR)

(73) Assignees: Electronics and Telecommunications Research Institute, Daejon (KR); Samsung Electronics Co. Ltd., Suwon-si (KR)

( * ) Notice: Subject to any disclaimer, the term of this patent is extended or adjusted under 35 U.S.C. 154(b) by 110 days.

(21) Appl. No.: 12/293,960

(22) PCT Filed: Mar. 22, 2007

(86) PCT No.: PCT/KR2007/001403

§ 371 (c)(1),
(2), (4) Date: Sep. 22, 2008

(87) PCT Pub. No.: WO2007/108656

PCT Pub. Date: Sep. 27, 2007

(65) Prior Publication Data

US 2009/0135718 A1     May 28, 2009

(51) Int. Cl.
*H04L 1/00* (2006.01)
(52) U.S. Cl. .............. 370/242; 714/749; 714/799
(58) Field of Classification Search ........... 370/242, 370/225; 714/746, 748, 749, 751, 799
See application file for complete search history.

(56) References Cited

U.S. PATENT DOCUMENTS

| 6,931,569 | B2 | 8/2005 | Fong et al. |
| 2003/0140296 | A1* | 7/2003 | Odman ............... 714/749 |
| 2007/0245201 | A1* | 10/2007 | Sammour et al. ..... 714/748 |
| 2010/0091721 | A1* | 4/2010 | Larmo et al. ........ 370/329 |

FOREIGN PATENT DOCUMENTS

EP    1 111 832    6/2001

OTHER PUBLICATIONS

International Search Report for PCT/KR2007/001403 dated Jun. 21, 2007.

* cited by examiner

*Primary Examiner*—Ricky Ngo
*Assistant Examiner*—Luat Phung
(74) *Attorney, Agent, or Firm*—Kile Park Reed & McManus

(57) ABSTRACT

Provided is a method for retransmission in a mobile communication system; and, more particularly, to an integrated operation method of Automatic Retransmission Request (ARQ) and Hybrid Automatic Retransmission Request (HARQ) in a mobile communication system. The method includes the steps of: a) shifting to a $2^{nd}$ layer waiting status upon receipt of $1^{st}$ layer reception failure information in a sending status that a fragment block of $2^{nd}$ layer transmission data is transmitted to the a receiver according to the predetermined retransmission number; b) shifting to a $1^{st}$ layer receiving status upon receipt of $1^{st}$ layer reception success information in the sending status; and c) shifting to the transmission completion status upon receipt of the $2^{nd}$ layer reception success information in the sending status.

10 Claims, 13 Drawing Sheets

METHOD FOR RETRANSMISSION IN MOBILE COMMUNICATION SYSTEM

TECHNICAL FIELD

The present invention relates to a method for retransmission in a mobile communication system; and, more particularly, to an integrated operation method of Automatic Retransmission Request (ARQ) and Hybrid Automatic Retransmission Request (HARQ) in a mobile communication system.

BACKGROUND ART

A retransmission method used for reliable data transmission in a mobile communication system includes Automatic Retransmission Request (ARQ) and Hybrid Automatic Retransmission Request (HARQ). In a conventional mobile communication system, the ARQ and the HARQ are individually used in a data link layer, i.e., a $2^{nd}$ layer (L2), and a physical layer, i.e., a $1^{st}$ layer (L1).

The ARQ located in a base station or an upper node has a 1:1 relationship with the ARQ of a user equipment and secures reliable transmission. However, since input SDU of ARQ, includes a packet of a Packet Data Convergence Protocol (PDCP) or Internet Protocol (IP) layer, the SDU is remarkably larger than a transport block (TB) used in an air transmission section. Therefore, there is a problem that a retransmission delay time of the ARQ may become longer than a delay time of a radio section.

To overcome the above problem, the HARQ is introduced in the L1 layer and the transport block of a relatively small size is retransmitted in the L1 layer. Accordingly, an abandonment rate of the SDU due to excess of a delay time can be reduced.

However, since the ARQ and the HARQ are individually retransmitted in different layers, a transmission delay time increases and an inefficient process such as retransmission of data occurs.

DISCLOSURE

Technical Problem

An embodiment of the present invention is directed to providing an integrated operation method of Automatic Retransmission Request (ARQ) and Hybrid Automatic Retransmission Request (HARQ) in a mobile communication system by cooperating the ARQ operating in a $2^{nd}$ layer and the HARQ operating in a $1^{st}$ layer.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method includes: a) shifting to a $2^{nd}$ layer waiting status upon receipt of $1^{st}$ layer reception failure information in a sending status that a fragment block of $2^{nd}$ layer transmission data is transmitted to the a receiver according to the predetermined retransmission number; b) shifting to a $1^{st}$ layer receiving status upon receipt of $1^{st}$ layer reception success information in the sending status; and c) shifting to the transmission completion status upon receipt of the $2^{nd}$ layer reception success information in the sending status.

ADVANTAGEOUS EFFECTS

The present invention can raise transmission efficiency and reduce a transmission delay time by cooperating Automatic Retransmission Request (ARQ) operating in a $2^{nd}$ layer and Hybrid Automatic Retransmission Request (HARQ) operating in a $1^{st}$ layer.

DETAILED DESCRIPTION OF MAIN PARTS OF DRAWINGS

10: scheduler  20: ARQ processing unit
30: HARQ processing unit

BEST MODE FOR THE INVENTION

In accordance with an aspect of the present invention, there is provided a method includes: a) a) shifting to a $2^{nd}$ layer waiting status upon receipt of $1^{st}$ layer reception failure information in a sending status that a fragment block of $2^{nd}$ layer transmission data is transmitted to the a receiver according to the predetermined retransmission number; b) shifting to a $1^{st}$ layer receiving status upon receipt of $1^{st}$ layer reception success information in the sending status; and c) shifting to the transmission completion status upon receipt of the $2^{nd}$ layer reception success information in the sending status.

In accordance with another aspect of the present invention, there is provided a method for retransmission in a mobile communication system, including the steps of: a) shifting to a $1^{st}$ layer waiting status upon receipt of $1^{st}$ layer reception failure information in a sending status that a transport block is being transmitted to a receiver; b) shifting to a $1^{st}$ layer receiving status upon receipt of $1^{st}$ layer reception success information in the sending status; and c) shifting to a transport block null status upon receipt of a $2^{nd}$ layer reception success information in the $1^{st}$ layer receiving status.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
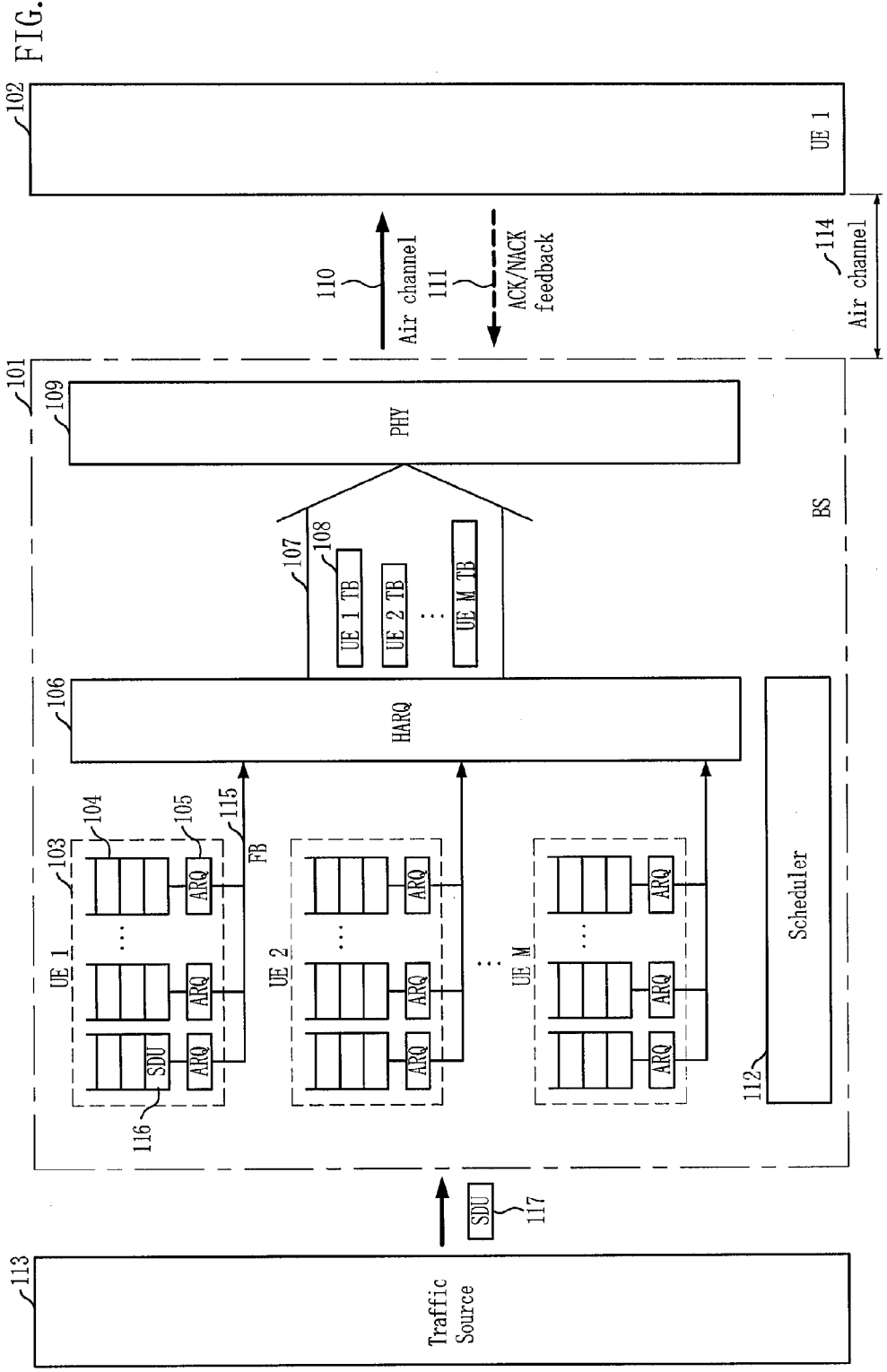
FIG. 1 is a block diagram showing a general Automatic Retransmission Request (ARQ) and Hybrid Automatic Retransmission Request (HARQ) process for down-link traffic transmission.
Figure 2:
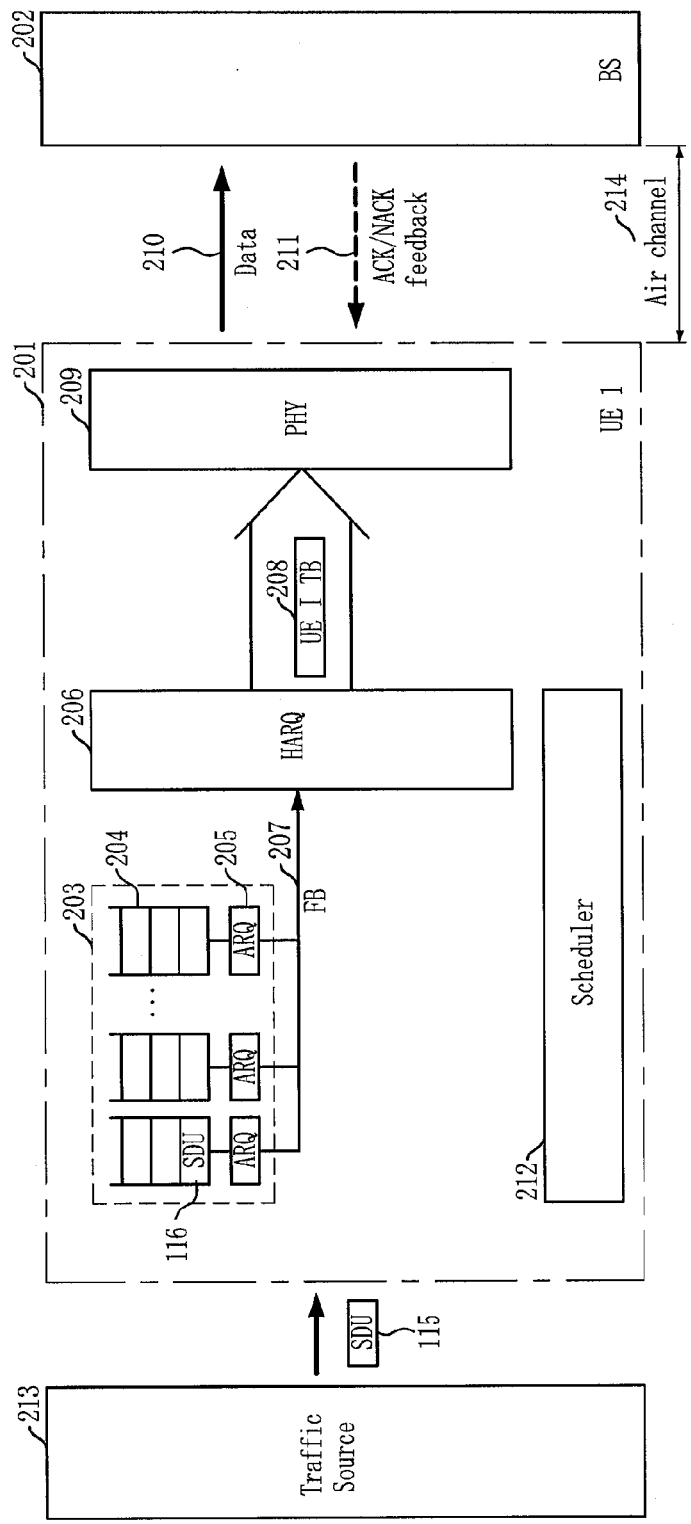
FIG. 2 is a block diagram showing a general ARQ and HARQ process for up-link traffic transmission.

FIG. 1 is a block diagram showing a general Automatic Retransmission Request (ARQ) and Hybrid Automatic Retransmission Request (HARQ) process for down-link traffic transmission. FIG. 2 is a block diagram showing a general ARQ and HARQ process for up-link traffic transmission. The down-link traffic means traffic from a base station (BS) to a user equipment in accordance with the embodiment of the present invention. The up-link traffic means traffic from the user equipment to the base station.

Referring to FIG. 1, SDUs 116 and 117 are created in a traffic source 113 are generated and enters a buffer 104 of the base station. A user equipment 103 may include a plurality of buffers and the buffers may have different traffic quality of service (QoS).

In transmission, an ARQ 105 transmits and retransmits the SDU and performs fragmentation and concatenation functions of the SDU. The fragmentation and concatenation functions of the SDU will be described in detail with reference to FIG. 3.

When a scheduler 112 determines a transmission quantity of each buffer, the ARQ transmits the SDU of the quantity determined by the scheduler from the buffer to the HARQ. Since there is a possibility that the quantity determined by the scheduler does not satisfy the SDU limit, SDU is fragmented and concatenated. Another object of the SDU fragmentation is originated from alterability in a time of an air channel. For example, when the air channel of a specific user equipment is insufficient for SDU transmission, partial SDU, i.e., an SDU fragment, is transmitted. The SDU fragment is called a fragment block (FB). The FB may be the SDU fragment or SDU itself.

The fragment block from each buffer of a specific user equipment 103 is transmitted to an HARQ 106 and includes transport blocks 108 on the user equipment. The transport block is a basic unit of the HARQ and is an input unit of channel encoding performed in a physical (PHY) layer 109. An encoded transport block is transmitted to the user equipment through air channels 110 and 114.

A user equipment 102 receiving the encoded transport block performs decoding and recovers an original transport block. When decoding succeeds, the user equipment transmits acknowledgement (ACK) through an air channel. When decoding fails, the user equipment transmits non-acknowledgement (NACK) through the air channels 111 and 114.

The procedure described above is a basic ARQ/HARQ transmission process and more detailed transmission process of the ARQ/HARQ will be described with reference to FIGS. 4 to 6. Since the basic transmission process of the ARQ/HARQ from the user equipment to the base station, which is shown in FIG. 2, is the same as the process of FIG. 1, detailed description will not be provided hereinafter.

Figure 3:
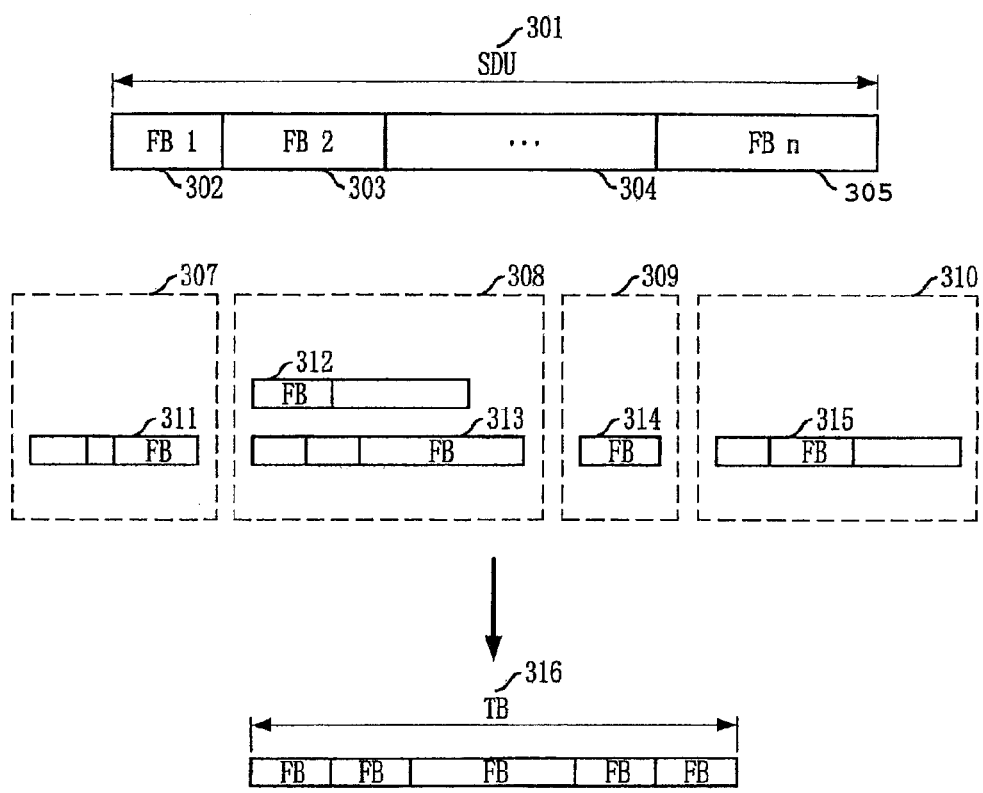
FIG. 3 is a block diagram showing a creating procedure of a fragment block (FB) and a transport block (TB), which are applied to the present invention.

FIG. 3 is a block diagram showing a creating procedure of the fragment block (FB) and the transport block (TB), which are applied to the present invention. FIG. 3 shows a procedure that an SDU is fragmented and a fragment block is created, and a procedure that a transport block, i.e., a HARQ basic transmission unit, is created from the fragment blocks of many buffers.

As shown in FIG. 3, an SDU 301 is fragmented into fragment blocks 302, 303 and 305 and transmitted. A size of each fragment block can depend on an air channel status of the user equipment. A fragment block 1 denotes the $1^{st}$ transmission quantity of the SDU; a fragment block 2, the $2^{nd}$ transmission quantity of the SDU; and a fragment block n, the $n^{th}$ transmission quantity of the SDU.

Also, a transport block 316, which is a basic transmission unit of the HARQ from a plurality of buffers 307, 308, 309 and 310 included in a user equipment, is created. The SDU waits in the buffer 307 and a last fragment block 311 is transmitted. At present, two SDUs wait in the buffer 308 and a last fragment block 313 of the $1^{st}$ SDU and $1^{st}$ fragment block 312 of the $2^{nd}$ SDU are transmitted. An SDU waits in the buffer 309 and the entire SDUs are transmitted. That is, the SDU itself becomes a fragment block 314. An SDU waits in the buffer 310 and a middle fragment block 315 is transmitted. A block summating the entire fragment blocks becomes a transport block of the user equipment and a basic unit of the HARQ transmission.

Figure 4:
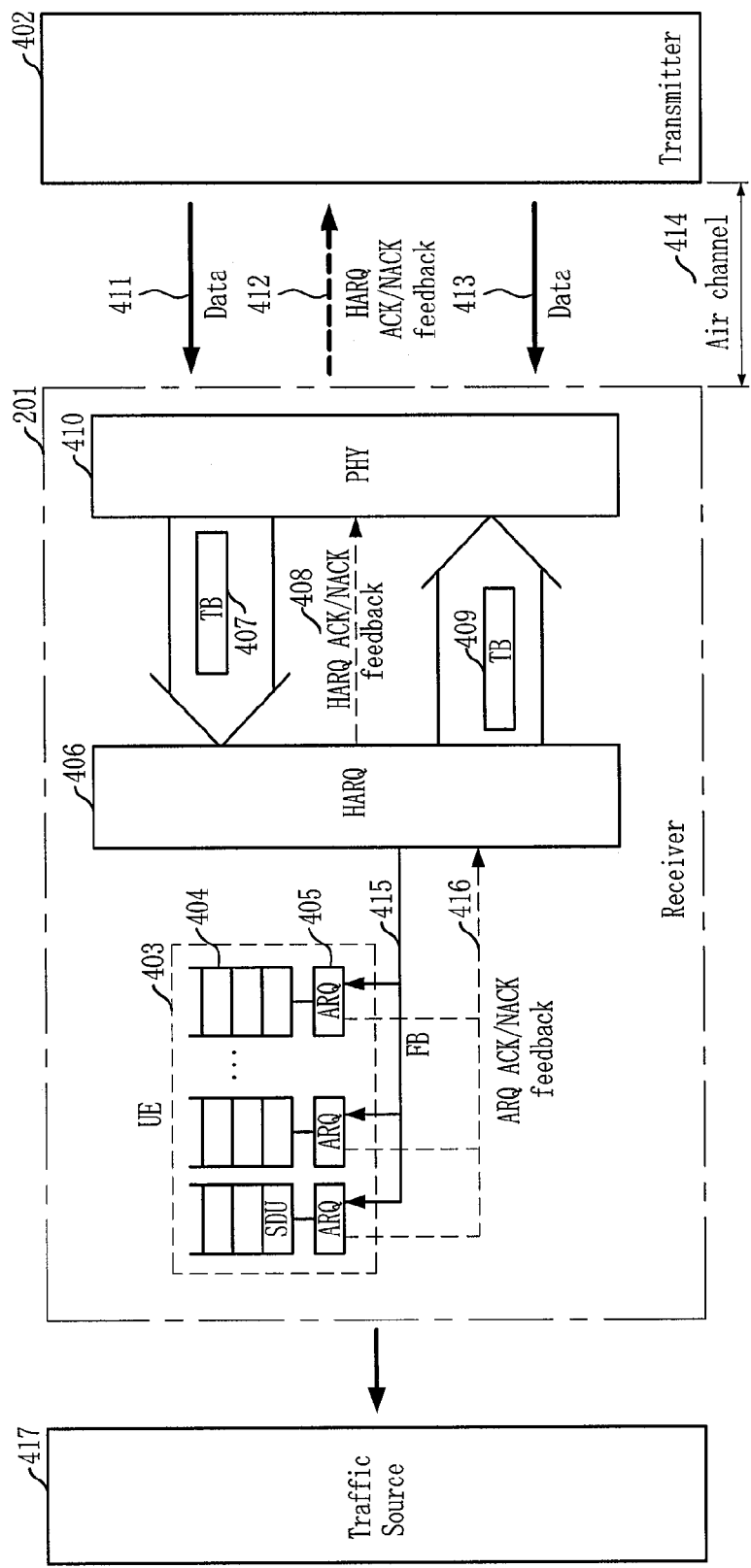
FIG. 4 is a block diagram showing a general ARQ/HARQ process and an ACK/NACK feedback process of the ARQ/HARQ in transmitter and receivers.

FIG. 4 is a block diagram showing a general ARQ/HARQ process and an ACK/NACK feedback process of the ARQ/HARQ in transmitter and receivers.

Referring to FIG. 4, when a transmitter 402 transmits a transport block, a receiver physical layer processing unit (PHY) 410 decodes the transport block and transmits the transport block to a receiver HARQ 406.

When decoding is successfully performed, the receiver HARQ 406 transmits the HARQ ACK on the air channel through the PHY 410. When decoding fails, the receiver HARQ 406 transmits the HARQ NACK on the air channel through the PHY 410. The receiver HARQ 406 transmits a fragment block corresponding to each buffer in the transport block to a receiver ARQ 405. The receiver ARQ 405 locates the transmitted fragment block in the inside of the buffer and the assembled SDU is transmitted to the upper layer.

The receiver ARQ 405 searches a subscriber number (SN) of the fragment blocks in each buffer and forms the ARQ ACK/NACK message. When a predetermined condition is satisfied, the ARQ ACK/NACK message is transmitted to the transmitter. That is, a gap between a time of receiving the fragment block and a time of transmitting the ARQ ACK/NACK message is variable. A control message for controlling the ARQ and HARQ includes an ARQ ACK/NACK message and an HARQ NACK-ACK search message.

A method for transmitting the ARQ ACK/NACK message when a predetermined condition is satisfied is the same as the method for transmitting the transport block. That is, the transport block includes a fragment block and a control message. The ARQ ACK/NACK message included in the transport block is transmitted to the transmitter. The transmitter transmits an HARQ ACK/NACK feedback on the transmitted transport block to the HARQ through the PHY. When the HARQ transmits the HARQ ACK/NACK feedback to the ARQ, the ARQ updates a status of the associated fragment block. The HARQ ACK/NACK feedback from the HARQ to the ARQ is transmitted. Meanwhile, the ARQ ACK/NACK message received through the control message is transmitted to the ARQ through the HARQ. That is, the ARQ ACK/NACK feedback from the HARQ to the ARQ is transmitted. The ARQ updates the status of the fragment block. Subsequently, the status of the transport block connected to the fragment block is updated in a direction from the ARQ to the HARQ.

Figure 5:
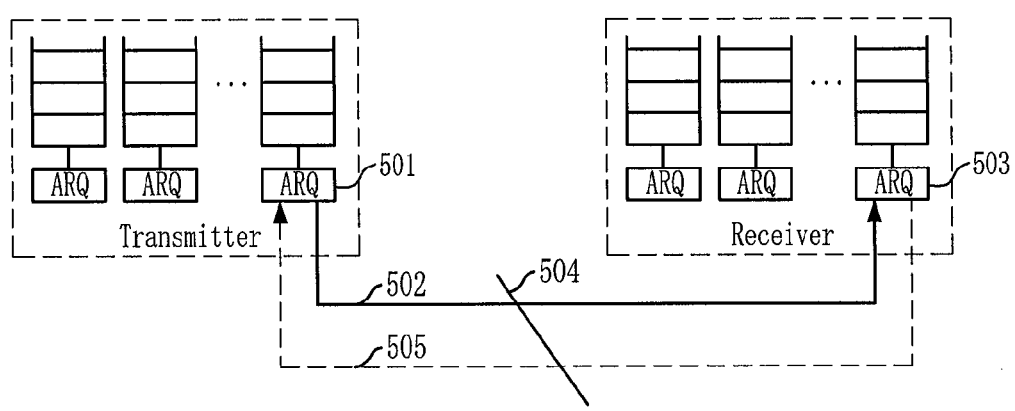
FIG. 5 shows a general fragment block transmission and an ACK/NACK feedback transmission between peer-to-peer ARQs of the transmitter/receiver.

FIG. 5 shows a general fragment block transmission and an ACK/NACK feedback transmission between peer-to-peer ARQs of the transmitter/receiver.

Referring to FIG. 5, when a transmitter ARQ 501 transmits a fragment block (see 502) and a receiver ARQ 503 receives the fragment block, the receiver ARQ 503 transmits to the transmitter ARQ 501 whether the fragment block is successfully received (see 505). A reference number 504 includes a transmitting chain of the HARQ 406, the PHY 410, and the air channels 411, 412 and 414 of FIG. 4.

Figure 6:
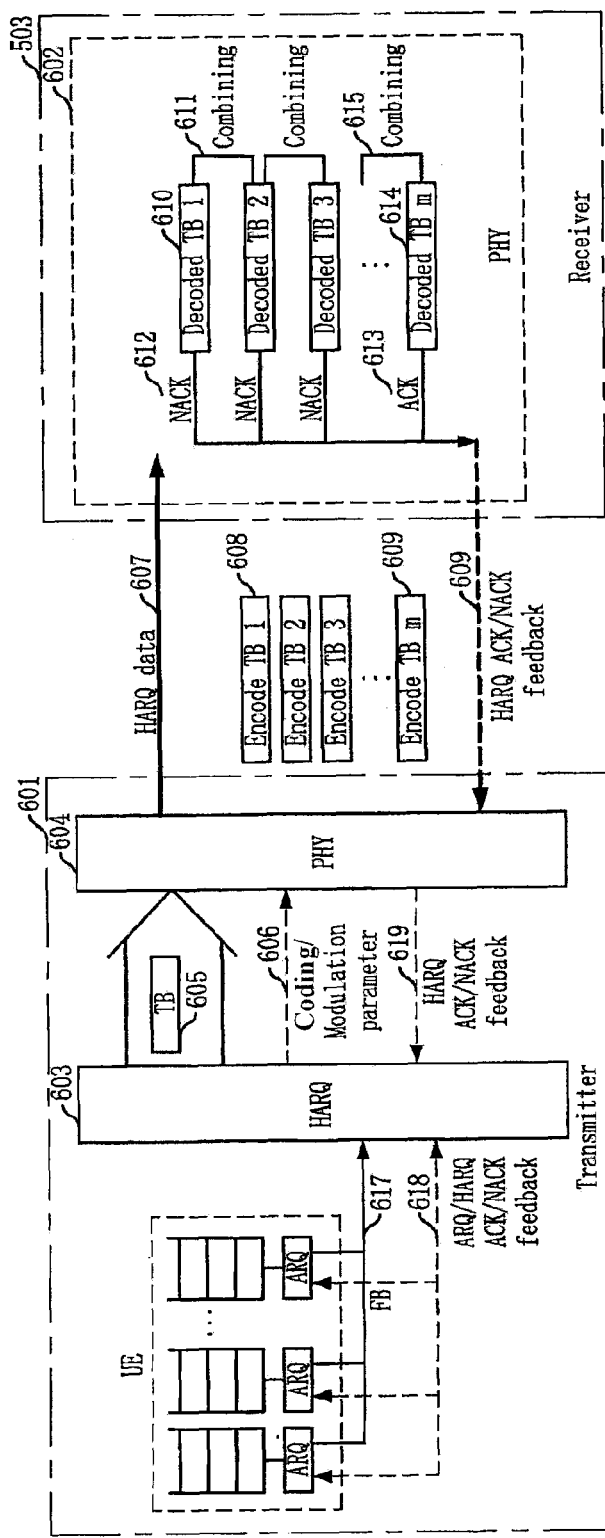
FIG. 6 shows the HARQ transmission and a general procedure that the ACK/NACK feedback of the ARQ/HARQ is transmitted.

FIG. 6 shows the HARQ transmission and a general procedure that the ACK/NACK feedback of the ARQ/HARQ is transmitted.

Referring to FIG. 6, a transport block 605 is formed from a fragment block 617 from each ARQ of the user equipment. A channel coded transport block 608 is initially transmitted to the user equipment based on a proper coding and modulation method of a reference number 606 (see 607).

When the transport block is decoded successfully, a PHY 602 of a receiver 503 transmits ACK. When decoding of the transport block fails, the PHY 602 of the receiver 503 transmits NACK (see 609). It is assumed in the present embodiment that NACK is initially transmitted. The transport block generated by the NACK is stored in the PHY to be combined with the retransmitted transport block. A transmitter receiving the NACK retransmits the transport block by performing coding and modulation on the same transport block, if necessary. A receiver receiving a $2^{nd}$ transport block is combined with a $1^{st}$ transport block. In the present embodiment, the $2^{nd}$ transmission is also NACK. When an $m^{th}$ transport block 616 is transmitted and combining succeeds by repeating the above process, the receiver transmits the ACK.

An HARQ ACK/NACK 609 receiving a feedback from the receiver is transmitted to a HARQ 603 of the transmitter and controls the HARQ process. An ARQ/HARQ ACK/NACK feedback 618 is performed between the ARQ and the HARQ. A feedback from the HARQ to ARQ is an HARQ ACK/NACK feedback and a feedback from the ARQ to the HARQ is an ARQ ACK/NACK feedback. The usage of the feedback is to provide a basic method of the ARQ/HARQ integrated operation according to the present invention. Cases that an error of the HARQ ACK/NACK feedback is generated are as follows. A first case is that the HARQ ACK transmitted from the receiver is recognized as NACK in the transmitter. A second case is that the HARQ NACK transmitted from the receiver is recognized as ACK in the transmitter. In the conventional mobile communication system, in an HARQ ACK-NACK error that the HARQ ACK is recognized as NACK, HARQ retransmission is simply performed. Also, in an HARQ NACK-ACK error that the HARQ NACK is recognized as ACK, the transport block is deleted in the transmitter and an error which cannot be recovered is generated.

Figure 7:
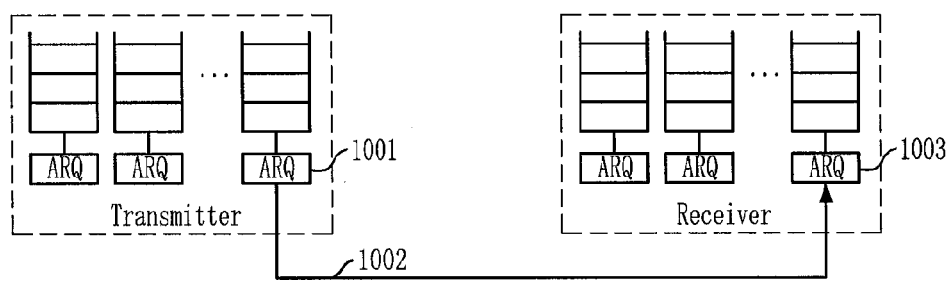
FIG. 7 is an exemplary diagram for describing an ARQ unacknowledged mode (UM) sending status.

FIG. 7 is an exemplary diagram for describing an ARQ unacknowledged mode (UM) sending status. The UM sending status is a sending status that retransmission is not performed on the fragment block whose transmission fails in the ARQ layer.

Referring to FIG. 7, an ARQ 1001 of the transmitter transmits a fragment block to an ARQ 1003 of the receiver. The ARQ of the receiver does not transmit an ARQ ACK/NACK feedback on the received fragment block. The HARQ may be applied to the UM sending status. Herein, the HARQ transmission of the transport block including the fragment block is included. It means that the fragment block, which is the transport block of the same concept, is retransmitted until the transmitter receives the HARQ ACK on the transport block, or until the maximum retransmission of the HARQ is performed. That is, retransmission is not performed in the ARQ layer, but may be performed in the HARQ layer.

Figure 8:
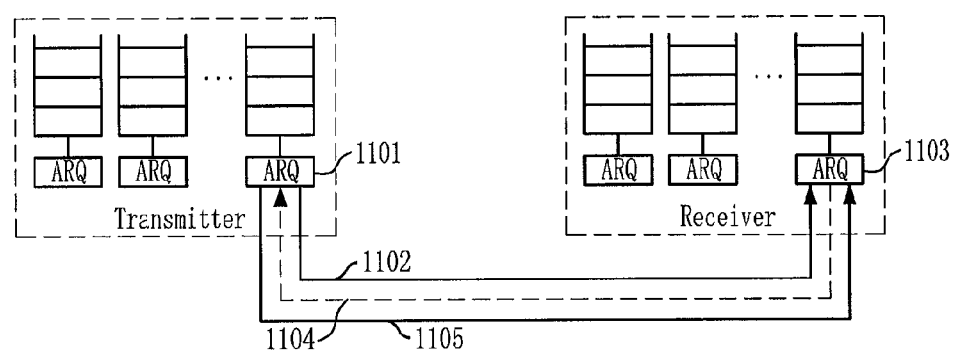
FIG. 8 is an exemplary diagram for describing an ARQ acknowledged mode (AM) sending status.

FIG. 8 is an exemplary diagram for describing an ARQ acknowledged mode (AM) sending status. The AM sending status is a sending status for performing retransmission on the fragment block whose transmission fails in the ARQ layer.

Referring to FIG. 8, an ARQ 1101 of the transmitter transmits a fragment block to an ARQ 1103 of the receiver (see 1102). An ARQ 1103 of the receiver transmits an ARQ ACK/NACK feedback on the received fragment block (see 1104). In case of the ARQ NACK, the transmitter retransmits the fragment block (see 1105). The transmission of reference numbers 1102 and 1105 includes the HARQ transmission of the transport block including the fragment block. It means that the fragment block, which has the same concept as the transport block, is retransmitted until the transmitter receives the HARQ ACK on the transport block or until maximum retransmission of the HARQ is performed. That is, retransmission in the ARQ layer and the HARQ layer may be performed.

There are diverse transmitting methods according to the UM/AM or application of the HARQ and it differs the status and status shift of the fragment block.

Figure 9:
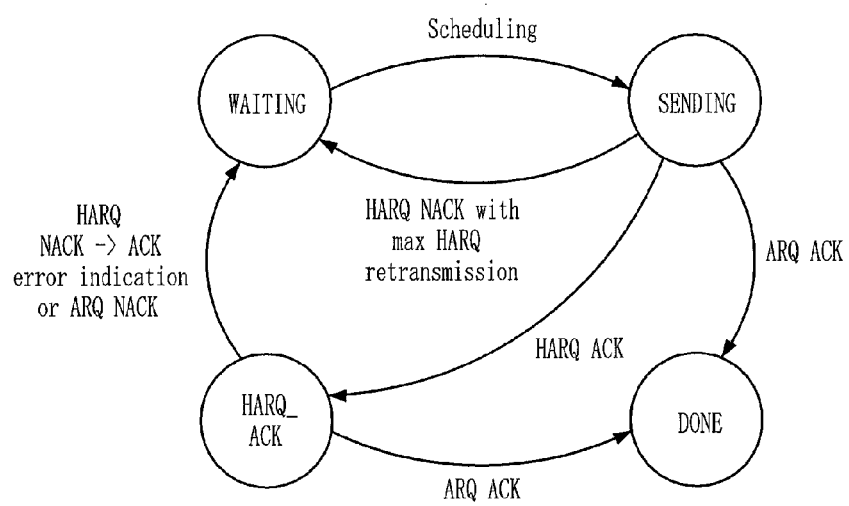
FIG. 9 shows the status and status shift of the ARQ AM fragment block in an ARQ/HARQ integrated operation environment in accordance with an embodiment of the present invention.

FIG. 9 shows the status and status shift of the ARQ AM fragment block in an ARQ/HARQ integrated operation environment in accordance with an embodiment of the present invention.

As shown in FIG. 9, the status of the fragment block according to the present invention includes a waiting status that transmission does not end, a sending status that the HARQ is being transmitted, an HARQ_ACK status that the HARQ ACK is received, a done status that the ARQ ACK is received.

Also, the status shift of the fragment block is operated as follows. When An HARQ NACK event with max HARQ retransmission is generated in the sending status, the status of the fragment block is shifted to the waiting status. When an HARQ ACK event receiving the HARQ ACK is generated in the sending status, the status of the fragment block is shifted to the HARQ_ACK status. When an ARQ ACK event receiving the ARQ ACK is generated in the sending status, the status of the fragment block is shifted to the done status. When the ARQ ACK event is generated in the HARQ_ACK status, the status of the fragment block is shifted to the done status. When an HARQ NACK-ACK error event (HARQ NACK->ACK error indication) that the HARQ NACK is erroneously recognized as the ACK in the HARQ_ACK status, the status of the fragment block is shifted to the waiting status.

Figure 10:
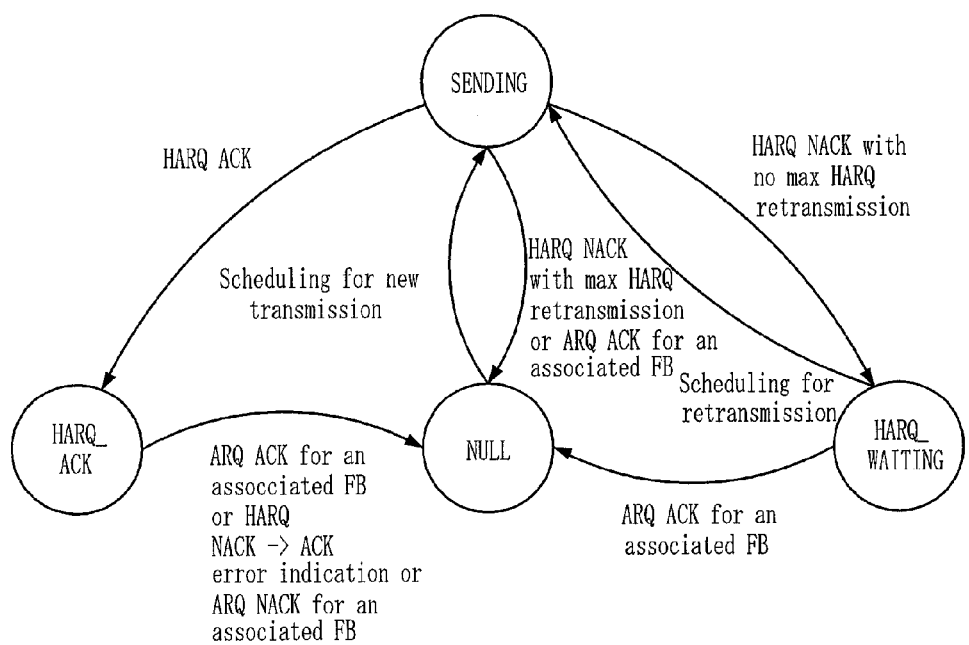
FIG. 10 shows a status and status shift of the transport block in an ARQ/HARQ integrated operation environment in accordance with the embodiment of the present invention.

FIG. 10 shows a status and status shift of the transport block in an ARQ/HARQ integrated operation environment in accordance with the embodiment of the present invention.

As shown in FIG. 10, the status of the transport block according to the present invention includes a null status, which is a status without a transport block, a sending status, which is a status in the middle of HARQ transmission, an HARQ_WAITING status, which is a status for waiting the HARQ transmission, an ARQ_ACK status, which is a status for receiving the HARQ ACK.

The transport block status shift is operated as follows. When a scheduling event for new transmission in the null status is generated, the status of the transport block is shifted to the sending status. When An HARQ NACK event with max HARQ retransmission or an ARQ ACK event for an associated fragment block is generated in the sending status, the status of the transport block is shifted to the null status. When An HARQ NACK event with no max HARQ retransmission is generated in the sending status, the status of the transport block is shifted to the HARQ_WAITING status. When a scheduling event for retransmission is generated in the HARQ_WAITING status, the status of the transport block is shifted to the sending status. When the HARQ ACK event is generated in the sending status, the status of the transport block is shifted to the HARQ_ACK status. When an ARQ ACK event for an associated fragment block, an HARQ NACK-ACK error indication event, or an ARQ NACK event for an associated fragment block is generated in the HARQ_ACK status, the status of the transport block is shifted to the null status.

Figure 11:
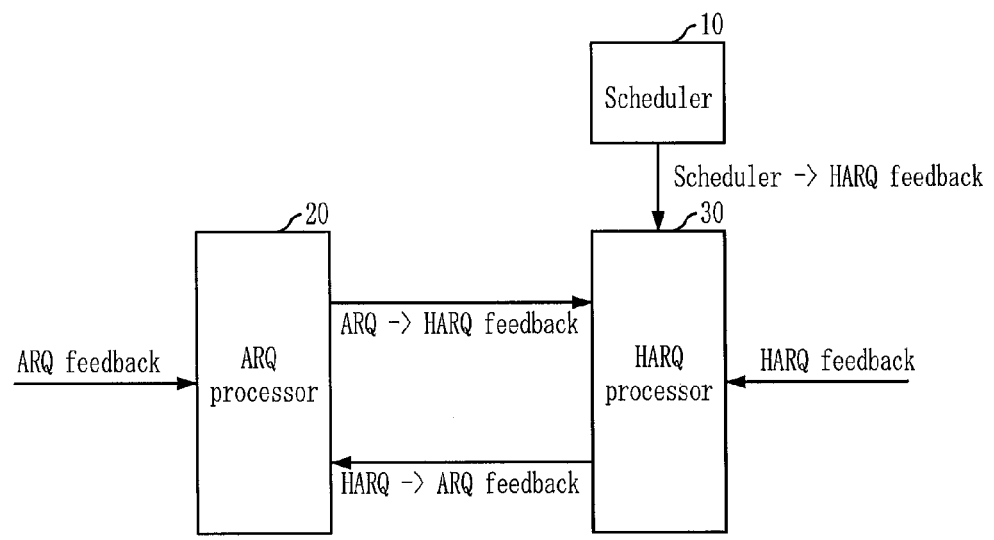
FIG. 11 shows an ARQ/HARQ integrated operation apparatus in accordance with an embodiment of the present invention.

FIG. 11 shows an ARQ/HARQ integrated operation apparatus in accordance with an embodiment of the present invention.

As shown in FIG. 11, the ARQ/HARQ integrated operation apparatus includes a scheduler 10, an ARQ processing unit 20 and an HARQ processing unit 30 as essential constituent elements.

An event outputted from the scheduler 10 to the ARQ processing unit 20 is defined as a scheduler->HARQ feedback. A detailed event is defined and operated as scheduling for new transmission and scheduling for retransmission with associated transport block.

An event outputted from the ARQ processing unit 20 to the HARQ processing unit 30 is defined as an ARQ->HARQ feedback. A detailed event is defined and operated as an ARQ ACK with associated transport block and an ARQ NACK with associated transport block.

An event outputted from the HARQ processing unit 30 to the ARQ processing unit 20 is defined as an HARQ->ARQ feedback. A detailed event is defined and operated as an HARQ ACK with associated transport block, an HARQ NACK with max HARQ retransmission with associated fragment block, an HARQ NACK->ACK error indication with associated fragment block, and scheduling for new transmission with associated fragment block.

The ARQ ACK and ARQ NACK events inputted in the ARQ processing unit 20 are defined and operated as an ARQ feedback.

The HARQ ACK, HARQ NACK, and HARQ NACK-ACK error indication events inputted in the HARQ processing unit 30 are defined and operated as an HARQ feedback.

Figure 12:
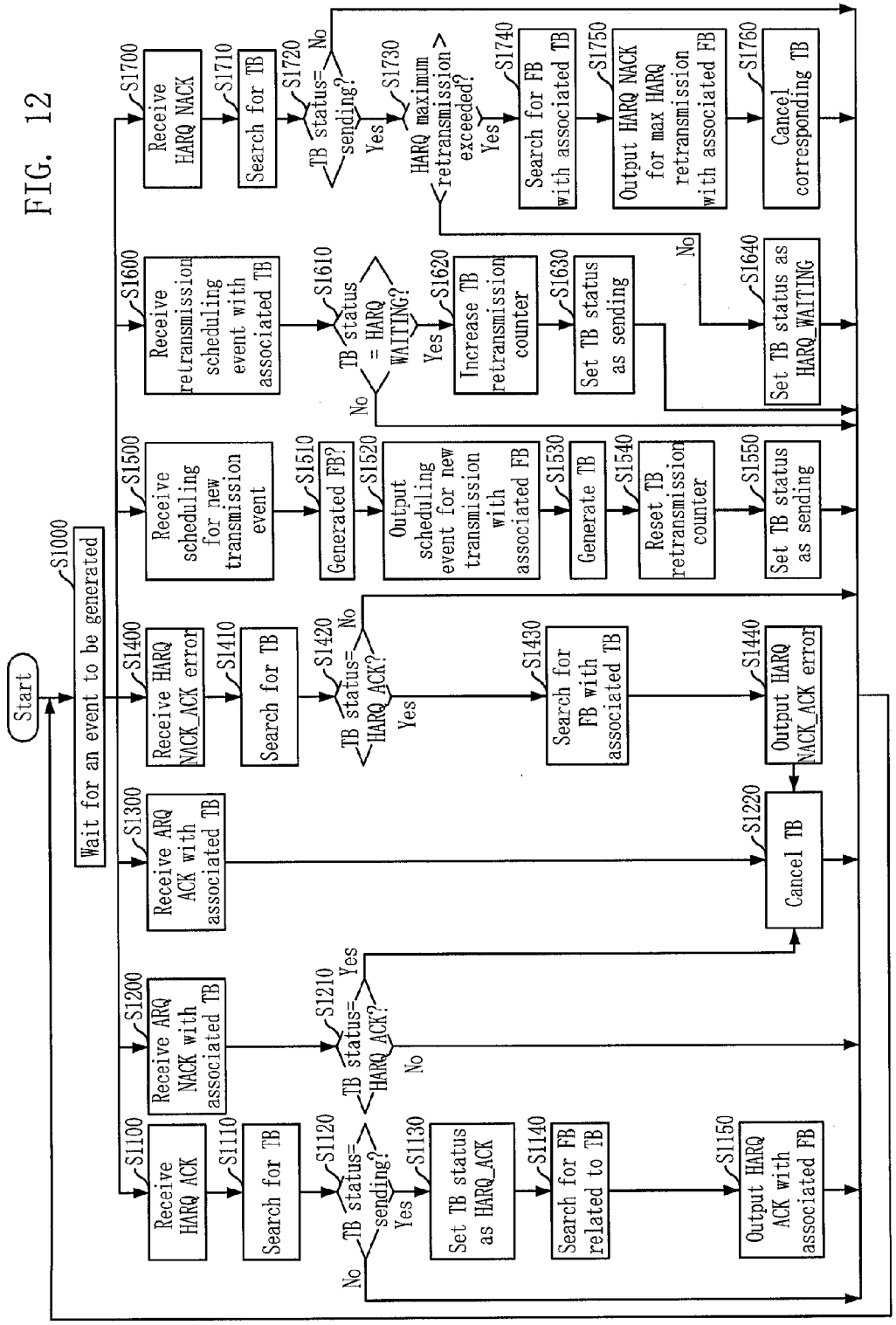
FIG. 12 is a flowchart describing an HARQ process in the ARQ/HARQ integrated operation environment in accordance with an embodiment of the present invention.

FIG. 12 is a flowchart describing an HARQ process in the ARQ/HARQ integrated operation environment in accordance with an embodiment of the present invention.

At step S1110, when an HARQ processing unit receives an HARQ ACK event at step S1000 of waiting for an event to be generated, the HARQ processing unit searches a corresponding transport block. At step S1120, the HARQ processing unit determines whether the searched transport block is in the sending status. When it turns out that the searched transport block is not in the sending status, the status of the transport block returns to the waiting status. When the transport block is in the sending status, the HARQ processing unit sets up and updates the status of the transport block as HARQ_ACK at step S1130, searches a fragment block associated with the transport block at step S1140, outputs an HARQ ACK event with associated fragment block to the ARQ processing unit at step S1150, and returns to the waiting status.

At step S1200, when the HARQ processing unit receives an ARQ NACK event with associated transport block in the waiting status of the step S1000, the HARQ processing unit determines at step S1210 whether the status of the transport block is HARQ_ACK. When it turns out that the status of the transport block is not HARQ_ACK, the HARQ processing unit returns to the waiting status. When the status of the transport block is the HARQ_ACK, the transport block is canceled at step S1220 and the HARQ processing unit returns to the waiting status.

At step S1300, when the HARQ processing unit receives an ARQ ACK event with associated transport block in the waiting status of the step S1000, the HARQ processing unit cancels the transport block at step S1220 and returns to the waiting status.

At step S1400, when the HARQ processing unit receives an HARQ NACK->ACK error indication event in the waiting status of the step S1000, the HARQ processing unit searches the transport block at step S1410 and determines at step S1420 whether the status of the transport block is HARQ_ACK. When it turns out that the status of the transport block is not HARQ_ACK, the HARQ processing unit returns to the waiting status. When the status of the transport block is the HARQ_ACK, the HARQ processing unit searches a fragment block associated with the transport block at step S1430, outputs an HARQ NACK->ACK error event indication with associated fragment block to the ARQ processing unit at step S1440, cancels the transport block at step S1220, and returns to the waiting status.

At step S1700, when the HARQ processing unit receives an HARQ NACK event in the waiting status of the step S1000, the HARQ processing unit searches the transport block at step S1710 and determines at step S1720 whether the transport block is in the sending status. When it turns out that the transport block is not in the sending status, the HARQ processing unit returns to the waiting status of the step s1000. When the transport block is in the sending status, the HARQ processing unit determines at step S1730 whether the transport block exceeds HARQ max retransmission. When it turns out that the transport block does not exceed the HARQ max retransmission, the HARQ processing unit sets up and updates the status of the transport block as HARQ_WAITING at step S1640, and returns to the waiting status of the step S1000. When the transport block exceeds the HARQ max retransmission, the HARQ processing unit searches the fragment block associated with the transport block at step S1740, and outputs an HARQ NACK event with max HARQ retransmission with associated fragment block to the ARQ processing unit at step S1750, cancels the transport block at step S1760, and returns to the waiting status of the step S1000.

At step S1500, when the HARQ processing unit receives a scheduling event for new transmission in the waiting status of the step S1000, the HARQ processing unit creates fragment blocks for new transmission at step S1510, outputs a scheduling event for new transmission with associated fragment block to the ARQ processing unit at step S1520, creates a transport block for the created fragment block at step S1530, sets up a transport block retransmission counter as 0 at step S1540, sets up the status of the transport block as the sending status at step S1550, and returns to the waiting status of the step S1000.

At step S1600, when the HARQ processing unit receives a scheduling event for retransmission with associated transport block in the waiting status of the step S1000, the HARQ processing unit determines whether the status of the transport block is HARQ_WAITING at step S1610. When the status of the transport block is not HARQ_WAITING, the HARQ processing unit returns to the waiting status of the step S1000. When the status of the transport block is HARQ_WAITING, the HARQ processing unit increases the transport block retransmission counter by 1 at step S1620, sets up and updates the status of the transport block as the sending status at step S1630, and returns to the waiting status of the step S1000.

Figure 13:
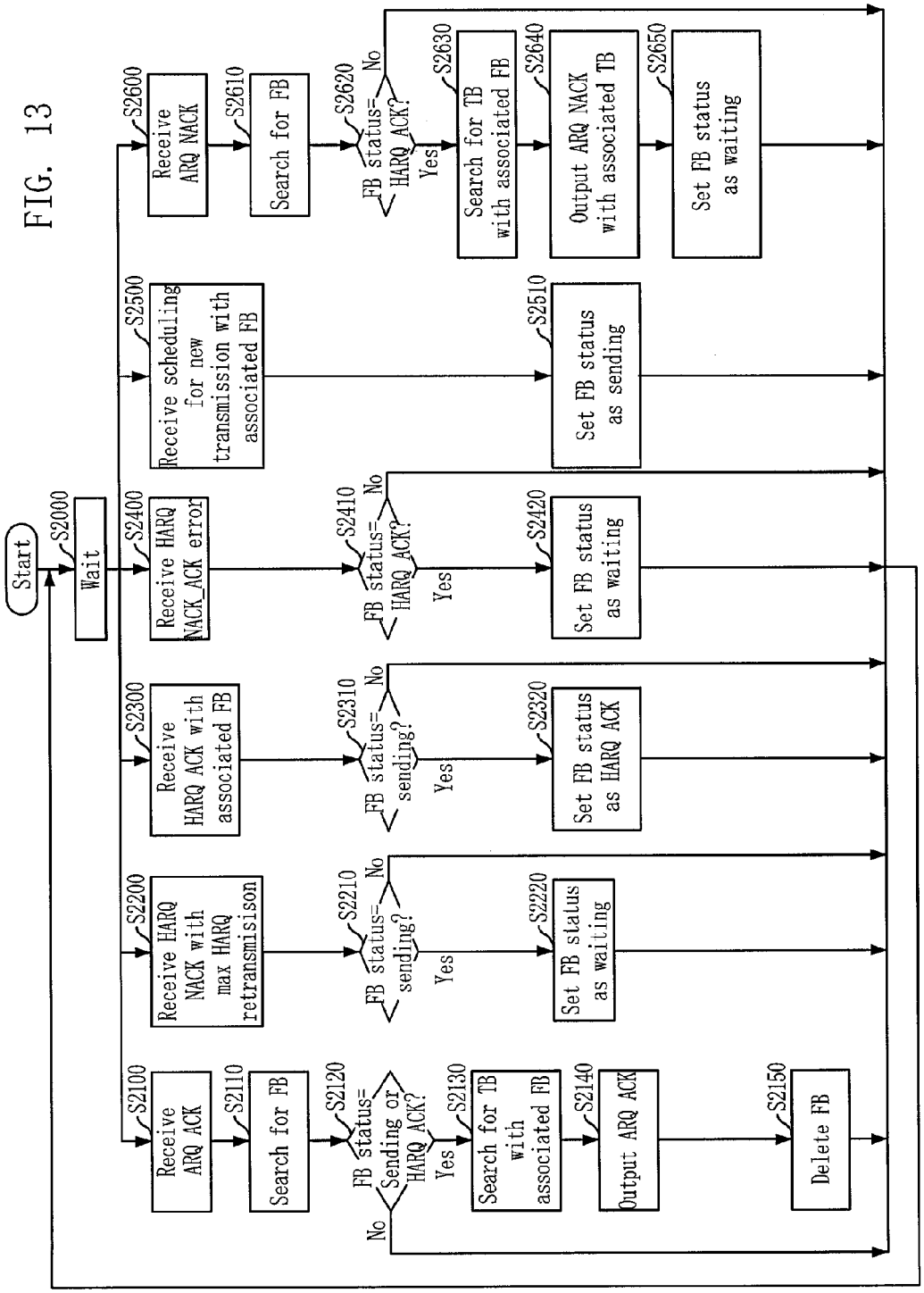
FIG. 13 is a flowchart describing an ARQ process in the ARQ/HARQ integrated operation environment in accordance with the embodiment of the present invention.

FIG. 13 is a flowchart describing an ARQ process in the ARQ/HARQ integrated operation environment in accordance with the embodiment of the present invention.

At step S2100, when the ARQ processing unit receives an ARQ ACK event at step S2000 of waiting for an event to be generated, the ARQ processing unit searches a corresponding fragment block at step S2110, and determines at step S2120 whether the status of the fragment block is sending or HARQ_ACK. When it turns out that the status of the fragment block is not sending or HARQ_ACK, the ARQ processing unit returns to the waiting status of the step S2000. When the status of the fragment block is sending or HARQ_ACK, the ARQ processing unit searches a transport block associated with the fragment block at step S2130, outputs an ARQ ACK event with associated transport block to the HARQ processing unit at step S2140, deletes the fragment block at step S2150, and returns to the waiting status of the step S2000.

At step S2200, when the ARQ processing unit receives an HARQ NACK event for max HARQ retransmission with associated fragment block in the waiting status of the step S2000, the ARQ processing unit determines at step S2210 whether the fragment block is in the sending status. When it turns out that the fragment block is not in the sending status, the ARQ processing unit returns to the waiting status of the step S2000. When the fragment block is in the sending status, the status of the fragment block is set up and updated as waiting at step S2220, and returns to the waiting status of the step S2000.

At step S2300, when the ARQ processing unit receives an HARQ ACK event with associated fragment block in the waiting status of the step S2000, the ARQ processing unit determines at step S2310 whether the fragment block is in the sending status. When it turns out that the fragment block is not in the sending status, the ARQ processing unit returns to the waiting status of the step S2000. When the fragment block is in the sending status, the ARQ processing unit sets up and updates the status of the fragment block as HARQ ACK at step S2320, and returns to the waiting status of the step S2000.

At step S2410, when the ARQ processing unit receives an HARQ NACK->ACK error indication event with associated fragment block in the waiting status of the step S2000, the ARQ processing unit determines whether the status of the fragment block is HARQ_ACK. When it turns out that the status of the fragment block is not HARQ_ACK, the ARQ processing unit returns to the waiting status of the step S2000. When the status of the fragment block is HARQ_ACK, the ARQ processing unit sets up and updates the status of the fragment block as HARQ_WAITING at step S2420, and returns to the waiting status of the step S2000.

At step S2500, when the ARQ processing unit receives an scheduling event for new transmission with associated fragment block in the waiting status of the step S2000, the ARQ processing unit sets up and updates the status of the fragment block as waiting at step S2510, and returns to the waiting status of the step S2000.

At step S2600, when the ARQ processing unit receives an ARQ NACK event in the waiting status of the step S2000, the ARQ processing unit searches the fragment block at step S2610. When the status of the fragment block is not HARQ_ACK, the ARQ processing unit returns to the waiting status of the step S2000. When the status of the fragment block is HARQ_ACK, the ARQ processing unit searches a transport block associated with the fragment block at step S2630, outputs an ARQ NACK event with associated transport block to the HARQ processing unit at step S2640, sets up and updates the status of the fragment block as waiting at step S2650, and returns to the waiting status of the step S2000.

Figure 14:
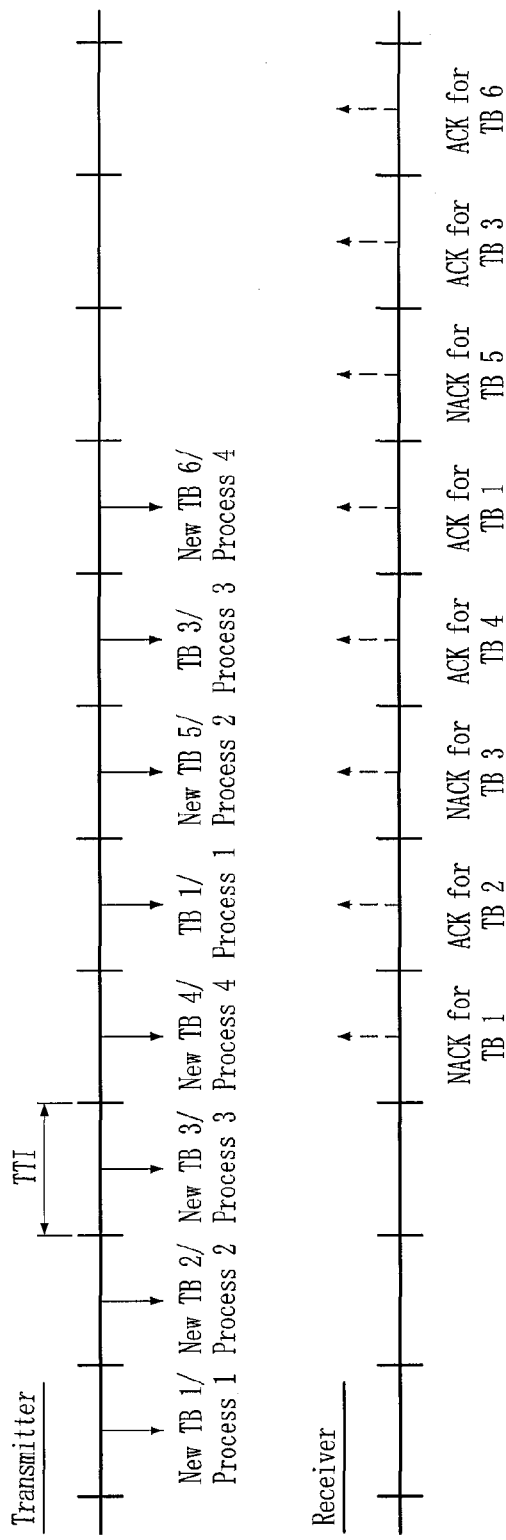
FIG. 14 shows an HARQ ACK/NACK receiving timing in accordance with an embodiment of the present invention.

FIG. 14 shows an HARQ ACK/NACK receiving timing in accordance with an embodiment of the present invention. FIG. 14 describes a basic concept of the HARQ process and a method that an HARQ process ID is allowed to the transport block.

As shown in FIG. 14, when new transport blocks are transmitted based on 4 HARQ process IDs including processes 1 to 4 in the transmitter, the receiver receives the transport blocks and performs feedback on HARQ ACK/NACK information associated with each transport block after a proper process time.

When the receiver transmits NACK with respect to transport blocks 1 and 3, the transmitter performs retransmission on the processes 1 and 3 where the transport blocks 1 and 3 are retransmitted, and transmits new transport blocks 5 and 6 with respect to the successfully transmitted processes 2 and 4.

Figure 15:
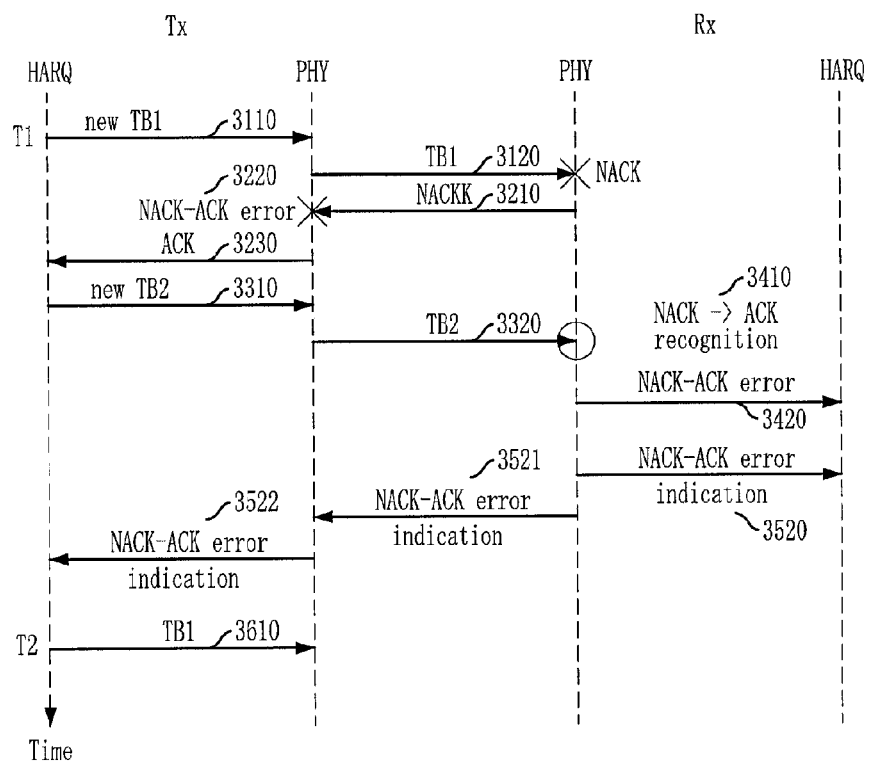
FIG. 15 shows a procedure for searching and overcoming an HARQ NACK-ACK error in accordance with an embodiment of the present invention.

FIG. 15 shows a procedure for searching and overcoming an HARQ NACK-ACK error in accordance with an embodiment of the present invention.

At T1, the transmitter transmits the transport block 1 based on an HARQ process ID i at step S3110.

An error is detected in the receiver and the HARQ NACK is transmitted at step S3210. The transmitter recognizes the error as HARQ ACK due to a channel error at step S3220.

The transmitter transmits the HARQ ACK to the HARQ processing unit at step S3230 and it is considered as transmission is completed. The transmitter transmits a new transport block 2 based on the process ID I at steps S3310 and S3320.

Since there is an error in the transport block 1, which is received through the process ID i, the receiver waits for retransmission. However, since the new transport block 2 is transmitted through the process ID i in a status that the HARQ max retransmission is not exceeded, the receiver recognizes the HARQ NACK->ACK error at steps S3410 and S3420.

The receiver requests transmission resources to notify an NACK-ACK error to the transmitter, or transmits an NACK->ACK error indication message based on acquired resources at steps S3520 and S3521. In the present embodiment, random access is used.

The transmitter receiving the NACK->ACK error indication message transmits the message to the HARQ processing unit at step S3522, and retransmits the transport block 1 based on the process ID i at steps S3610 and S3620.

As described above, the technology of the present invention can be realized as a program and stored in a computerreadable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention can raise transmission efficiency and reduce a transmission delay time by cooperating Automatic Retransmission Request (ARQ) and Hybrid Automatic Retransmission Request (HARQ) in a mobile communication system.

What is claimed is:

1. An integrated method of Automatic Retransmission Request (ARQ) and Hybrid Automatic Retransmission Request (HARQ) for retransmission in a mobile communication system, comprising the steps of:
   a) shifting to a 2nd layer waiting status upon receipt of 1st layer reception failure information according to a predetermined retransmission number in a sending status that a fragment block of 2nd layer transmission data is being transmitted to a receiver;
   b) shifting to a 1st layer receiving status upon receipt of 1st layer reception success information in the sending status;
   c) shifting to a transmission completion status upon receipt of the 2nd layer reception success information in the sending status; and
   d) shifting to the 2nd layer waiting status upon receipt of information notifying that the 1st layer reception failure information is erroneously recognized as the reception success information in the 1st layer receiving status.

2. The method of claim 1, further comprising the step of:
   e) shifting to the transmission completion status upon receipt of the 2nd layer reception success information in the 1st layer receiving status.

3. The method of claim 1, further comprising the step of:
   f) shifting to the 2nd layer waiting status upon receipt of the 2nd layer reception failure information in the 1st layer receiving status.

4. An integrated method of Automatic Retransmission Request (ARQ) and Hybrid Automatic Retransmission Request (HARQ) for retransmission in a mobile communication system, comprising the steps of:
   a) shifting to a 1st layer waiting status upon receipt of 1st layer reception failure information in a sending status that a transport block is being transmitted to a receiver;
   b) shifting to a 1st layer receiving status upon receipt of 1st layer reception success information in the sending status;
   c) shifting to a transport block null status upon receipt of a 2nd layer reception success information in the 1st layer receiving status; and
   d) shifting to the transport block null status upon receipt of information notifying that the 1st layer reception failure information is erroneously recognized as reception success information in the 1st layer receiving status.

5. The method of claim 4, further comprising the step of:
   e) shifting to the transport block null status upon receipt of the 2nd layer reception success information in the sending status.

6. The method of claim 4, further comprising the step of:
   f) shifting to the sending status upon receipt of scheduling for retransmission information in the 1st layer waiting status.

7. The method of claim 4, further comprising the step of:
   g) shifting to the transport block null status upon receipt of the 2nd layer reception failure information in the 1st layer receiving status.

8. The method of claim 4, further comprising the step of:
   h) shifting to the transport block null status upon receipt of the 2nd layer reception success information in the 1st layer waiting status.

9. The method of claim 4, further comprising the step of:
   i) shifting to the transport block null status upon receipt of a 1st layer reception fail message in the sending status according to a predetermined retransmission number.

10. The method of claim 4, further comprising the step of:
    j) shifting to the sending status upon receipt of scheduling information in the transport block null status for new transmission.

* * * * *